United States Patent
Gundam et al.

(10) Patent No.: US 9,552,330 B2
(45) Date of Patent: Jan. 24, 2017

(54) INDICATING A PAGE NUMBER OF AN ACTIVE DOCUMENT PAGE WITHIN A DOCUMENT

(75) Inventors: Raghuswamyreddy Gundam, Austin, TX (US); Newton P. Liu, Austin, TX (US); Douglas W. Oliver, Round Rock, TX (US); Terence Rodrigues, Austin, TX (US); Wingcheung Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 13/428,383

(22) Filed: Mar. 23, 2012

(65) Prior Publication Data
US 2013/0253935 A1 Sep. 26, 2013

(51) Int. Cl.
*G06F 17/21* (2006.01)

(52) U.S. Cl.
CPC .................... *G06F 17/211* (2013.01)

(58) Field of Classification Search
CPC .... G06F 3/0483; G06F 11/3419; G06F 17/211
See application file for complete search history.

(56) References Cited

U.S. PATENT DOCUMENTS

| | | | |
|---|---|---|---|
| 5,687,144 A * | 11/1997 | Nishizawa | 369/30.27 |
| 5,740,161 A | 4/1998 | Porter et al. | |
| 8,028,073 B2 | 9/2011 | Maes et al. | |
| 8,250,141 B2 * | 8/2012 | Xiao et al. | 709/204 |
| 8,799,757 B2 * | 8/2014 | Jewsbury et al. | 715/203 |
| 2005/0028106 A1 | 2/2005 | Nelson et al. | |
| 2007/0100986 A1 | 5/2007 | Bagley et al. | |
| 2008/0005244 A1 | 1/2008 | Vernon et al. | |
| 2009/0013045 A1 * | 1/2009 | Maes et al. | 709/205 |
| 2009/0327425 A1 | 12/2009 | Gudipaty | |
| 2009/0327915 A1 * | 12/2009 | Holdaway | G06F 9/4443 715/745 |
| 2011/0047231 A1 * | 2/2011 | Lim | G06F 17/30058 709/206 |
| 2011/0153735 A1 | 6/2011 | Eisenberg | |

* cited by examiner

*Primary Examiner* — Angela A Armstrong
(74) *Attorney, Agent, or Firm* — Brandon C. Kennedy; Grant A. Johnson; Kennedy Lenart Spraggins LLP

(57) ABSTRACT

Methods, apparatuses, and computer program products for indicating a page number of an active document page within a document are provided. Embodiments include detecting, by a presentation controller, activation of a document page on a presentation device; in response to detecting the activation of the document page on the presentation device, tracking, by the presentation controller, an amount of time that the document page is consecutively active on the presentation device; determining, by the presentation controller, that the amount of time that the document page is consecutively active on the presentation device exceeds a predetermined threshold; and in response to determining that the predetermined threshold has been exceeded, providing to a target source, by the presentation controller, an output indicating a page number of the document page while the document page is active on the presentation device.

18 Claims, 3 Drawing Sheets

INDICATING A PAGE NUMBER OF AN ACTIVE DOCUMENT PAGE WITHIN A DOCUMENT

BACKGROUND OF THE INVENTION

Field of the Invention

The field of the invention is data processing, or, more specifically, methods, apparatuses, and computer program products for indicating a page number of an active document page within a document.

Description of Related Art

Recent advancements in technology have increased the ease of presenting documents to a number of attendees. However, in some situations, the presentation attendees do not have the ability to view a presenter's screen and therefore must follow along on their own screens or printed materials. As such, it is common for an attendee to lose track of which page of a document is currently being presented.

SUMMARY OF THE INVENTION

Methods, apparatuses, and computer program products for indicating a page number of an active document page within a document are provided. Embodiments include detecting, by a presentation controller, activation of a document page on a presentation device; in response to detecting the activation of the document page on the presentation device, tracking, by the presentation controller, an amount of time that the document page is consecutively active on the presentation device; determining, by the presentation controller, that the amount of time that the document page is consecutively active on the presentation device exceeds a predetermined threshold; and in response to determining that the predetermined threshold has been exceeded, providing to a target source, by the presentation controller, an output indicating a page number of the document page while the document page is active on the presentation device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
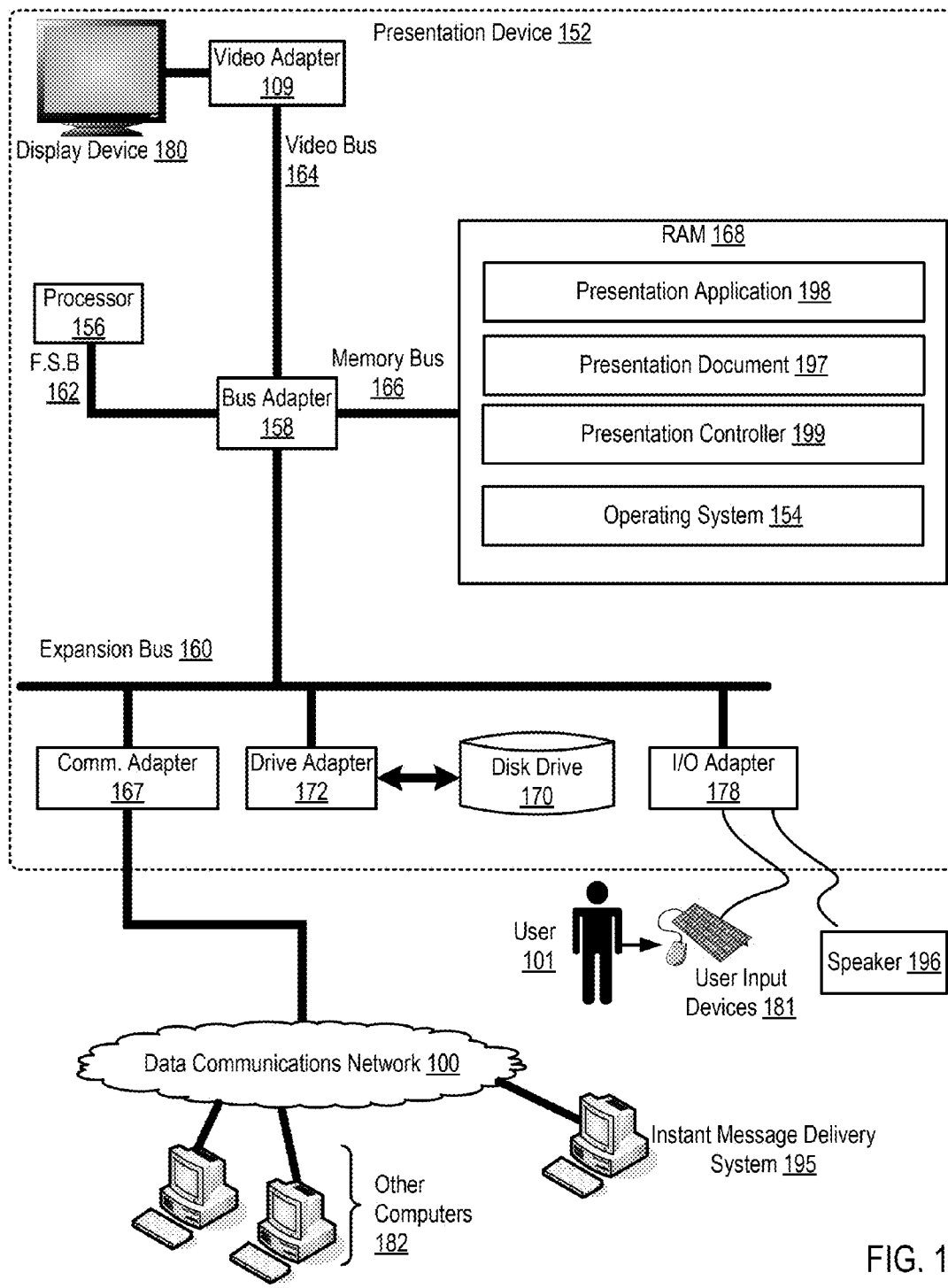
FIG. 1 sets forth a block diagram of automated computing machinery comprising an exemplary computer useful in indicating a page number of an active document page within a document according to embodiments of the present invention.

Exemplary methods, apparatus, and products for indicating a page number of an active document page within a document in accordance with the present invention are described with reference to the accompanying drawings, beginning with FIG. 1. Indicating a page number of an active document page within a document in accordance with the present invention is generally implemented with computers, that is, with automated computing machinery. FIG. 1 sets forth a block diagram of automated computing machinery comprising an exemplary presentation device (152) useful in indicating a page number of an active document page within a presentation document (197) according to embodiments of the present invention. The presentation device (152) of FIG. 1 includes at least one computer processor (156) or 'CPU' as well as random access memory (168) ('RAM') which is connected through a high speed memory bus (166) and bus adapter (158) to processor (156) and to other components of the presentation device (152).

Stored in RAM (168) is a presentation application (198), such as a word processing application or a PDF viewer. Also stored RAM (168) is a presentation document (197), such as a PDF document or a text document. Also stored in RAM (168) is a presentation controller (199) which includes computer program instructions for indicating a page number of an active document page of the presentation document (197) according to embodiments of the present invention. In a particular embodiment, the presentation controller (199) is a plug-in for the presentation application (198). An active document page is the page of the document that is currently being worked on, viewed, edited, or otherwise active with a user (101). The presentation controller (199) includes computer program instructions that when executed by the processor (156) cause the presentation device (152) to carry out the steps of: detecting, by the presentation controller (199), activation of a document page on a presentation device (152); in response to detecting the activation of the document page on the presentation device (152), tracking, by the presentation controller (199), an amount of time that the document page is consecutively active on the presentation device (152); determining, by the presentation controller (199), that the amount of time that the document page is consecutively active on the presentation device (152) exceeds a predetermined threshold; and in response to determining that the predetermined threshold has been exceeded, providing to a target source, by the presentation controller (199), an output indicating a page number of the document page while the document page is active on the presentation device (152).

Also stored in RAM (168) is an operating system (154). Operating systems useful indicating a page number of an active document page within a document according to embodiments of the present invention include UNIX™, Linux™, Microsoft XP™, AIX™, IBM's i5/OS™, and others as will occur to those of skill in the art. The operating system (154), the presentation application (198), the presentation document (197), and the presentation controller (199) in the example of FIG. 1 are shown in RAM (168), but many components of such software typically are stored in non-volatile memory also, such as, for example, on a disk drive (170).

The presentation device (152) of FIG. 1 includes disk drive adapter (172) coupled through expansion bus (160) and bus adapter (158) to processor (156) and other components of the presentation device (152). Disk drive adapter (172) connects non-volatile data storage to the presentation device (152) in the form of disk drive (170). Disk drive adapters useful in computers for indicating a page number of an active document page within a document according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example presentation device (152) of FIG. 1 includes one or more input/output ('I/O') adapters (178). I/O adapters implement user-oriented input/output through, for example, software drivers and computer hardware for controlling output to a speaker (196) and to display devices such as computer display screens, as well as user input from user input devices (181) such as keyboards and mice. The example presentation device (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary presentation device (152) of FIG. 1 includes a communications adapter (167) for data communications with other computers (182) and an instant message delivery system (195) via a data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for indicating a page number of an active document page within a document according to embodiments of the present invention include modems for wired dial-up communications, Ethernet (IEEE 802.3) adapters for wired data communications network communications, and 802.11 adapters for wireless data communications network communications.

Figure 2:
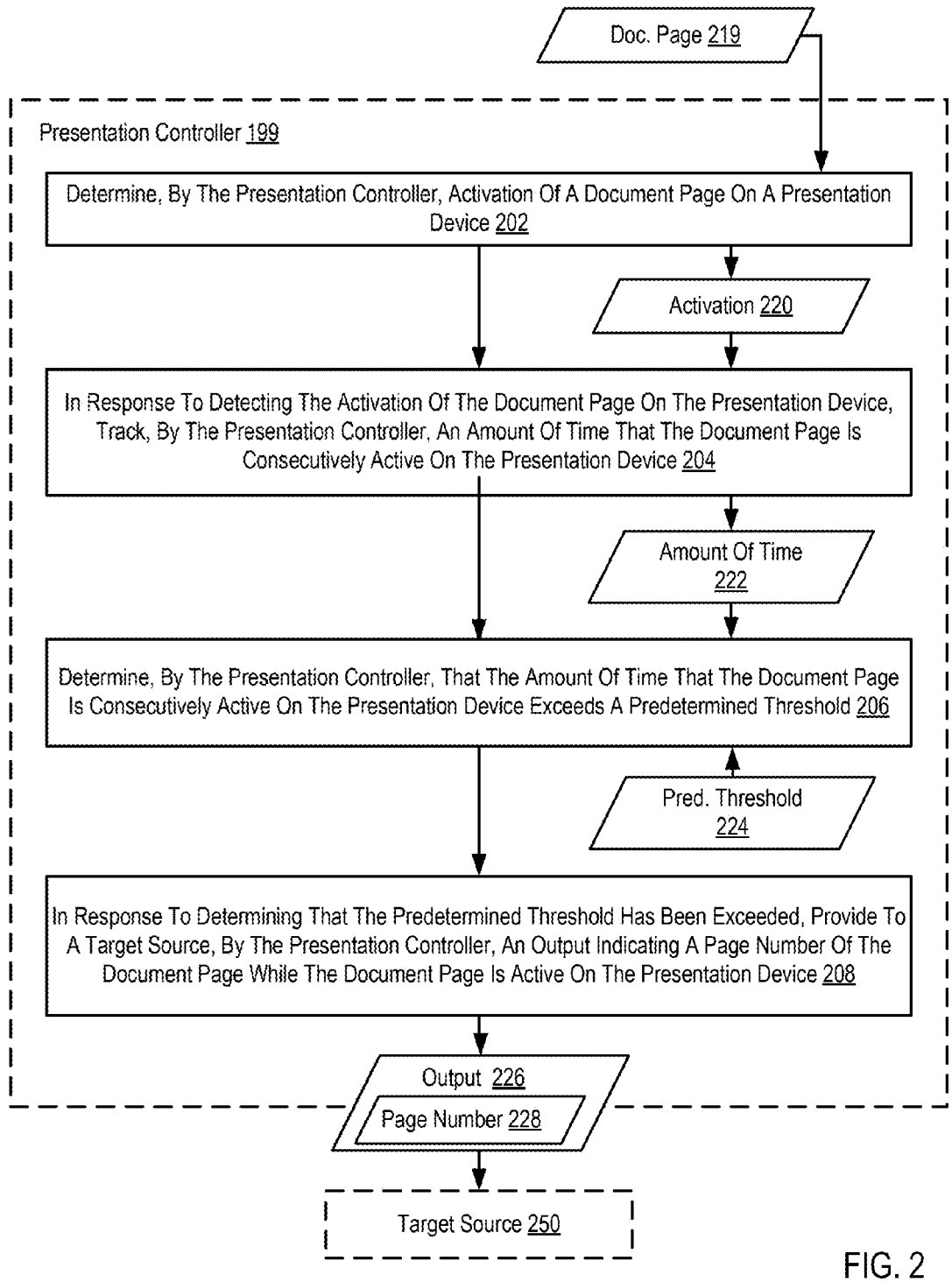
FIG. 2 sets forth a flow chart illustrating an exemplary method for indicating a page number of an active document page within a document according to embodiments of the present invention.

For further explanation, FIG. 2 sets forth a flow chart illustrating an exemplary method for indicating a page number of an active document page within a document according to embodiments of the present invention. The method of FIG. 2 includes detecting (202), by the presentation controller (199), activation (220) of a document page (219) on a presentation device (152). Detecting (202), by the presentation controller (199), activation (220) of a document page (219) on a presentation device (152) may be carried out by receiving an indication that a particular document page is active (e.g., a user is viewing the document page on a display).

The method of FIG. 2 also includes in response to detecting the activation (220) of the document page (219) on the presentation device (152), tracking (204), by the presentation controller (199), an amount (222) of time that the document page (219) is consecutively active on the presentation device (152). Tracking (204), by the presentation controller (199), an amount (222) of time that the document page (219) is consecutively active on the presentation device (152) may be carried out by recording a time corresponding to the initial activation of the document page; recording time from the initial activation to a document page change (e.g., user changes from a first page to a second page); and erasing the amount (222) of time in response to a document page change.

The method of FIG. 2 also includes determining (206), by the presentation controller (199), that the amount (222) of time that the document page (219) is consecutively active on the presentation device (152) exceeds a predetermined threshold (224). In a particular embodiment, the active document page of the document has at least one corresponding predefined threshold that is user programmable. Determining (206), by the presentation controller (199), that the amount (222) of time that the document page (219) is consecutively active on the presentation device (152) exceeds a predetermined threshold (224) may be carried out by comparing the amount (222) of time to the predetermined threshold (224).

The method of FIG. 2 includes in response to determining that the predetermined threshold (224) has been exceeded, providing (208) to a target source (250), by the presentation controller (199), an output (226) indicating a page number (228) of the document page (219) while the document page (219) is active on the presentation device (152). Providing (208) to a target source (250), by the presentation controller (199), an output (226) indicating a page number (228) of the document page (219) while the document page (219) is active on the presentation device (152) may be carried out by transmitting an instant message or playing an audio message over speakers.

Figure 3:
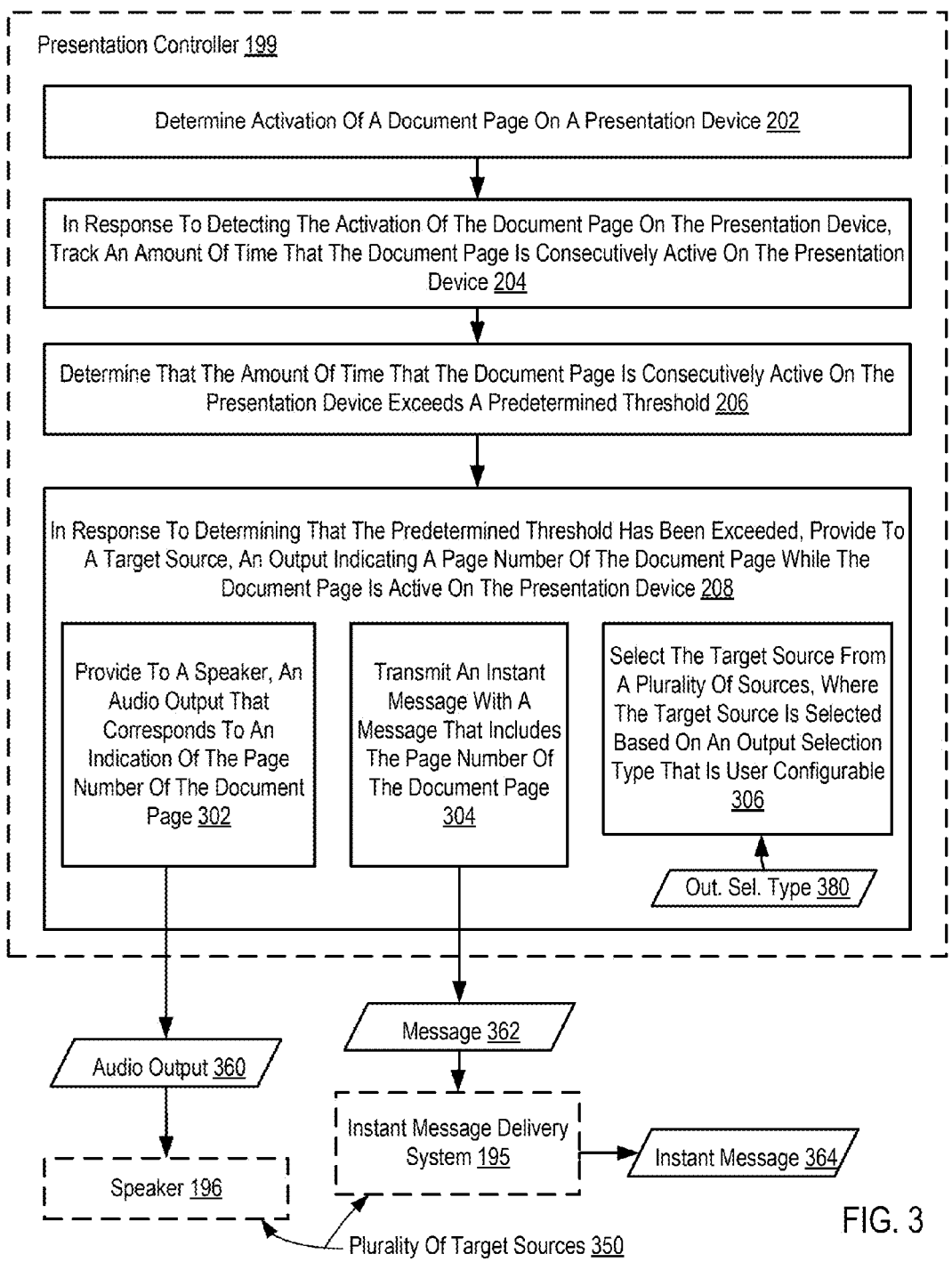
FIG. 3 sets forth a flow chart illustrating a further exemplary method for indicating a page number of an active document page within a document according to embodiments of the present invention.

For further explanation, FIG. 3 sets forth a flow chart illustrating a further exemplary method for indicating a page number of an active document page within a document according to embodiments of the present invention. The method of FIG. 3 is similar to the method of FIG. 2 in that the method of FIG. 3 also includes detecting (202), by the presentation controller (199), activation (220) of a document page (219) on a presentation device (152); in response to detecting the activation (220) of the document page (219) on the presentation device (152), tracking (204), by the presentation controller (199), an amount (222) of time that the document page (219) is consecutively active on the presentation device (152); determining (206), by the presentation controller (199), that the amount (222) of time that the document page (219) is consecutively active on the presentation device (152) exceeds a predetermined threshold (224); and in response to determining that the predetermined threshold (224) has been exceeded, providing (208) to a target source (250), by the presentation controller (199), an output (226) indicating a page number (228) of the document page (219) while the document page (219) is active on the presentation device (152).

The method of FIG. 3 also includes providing (302) an audio output (360) to a speaker (196). In the example of FIG. 3, the audio output (360) corresponds to an indication of the page number (228) of the document page (219). Providing (302) an audio output (360) to a speaker (196) may be carried out by playing a recording of a page number.

The method of FIG. 3 includes transmitting (304) an instant message (364) with a message (362) that includes the page number (228) of the document page (219). Transmitting (304) an instant message (364) with a message (362) that includes the page number (228) of the document page (219) may be carried out by transmitting the message (362) to an instant message delivery system (195) for transmission as an instant message (364).

In a particular embodiment, the audio output (360) and the message (364) are provided in a language selected by a user. Alternatively, a native language of one or more users may be determined and used to provide the audio output (360) and the message (364).

The method of FIG. 3 also includes selecting (306) the target source (250) from a plurality of sources (196, 195) where the target source is selected based on an output selection type (380) that is user configurable. Selecting (306) the target source (250) from a plurality of sources (196, 195) where the target source is selected based on an output selection type (380) that is user configurable may be carried out by receiving a user preference indicating an output delivery method. For example, a user may elect to have indications of page number delivered via a speaker.

Exemplary embodiments of the present invention are described largely in the context of a fully functional computer system for indicating a page number of an active document page within a document. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of indicating a page number of an active document page within a document, the method comprising:
   detecting, by a presentation controller, activation of an active document page on a presentation device by a user;
   in response to detecting the activation of the active document page on the presentation device, tracking, by the presentation controller, an amount of time that the active document page is consecutively active on the presentation device, being consecutively active including remaining on the active document page until receiving a page change indication from the user;
   programming each document page of the document a predetermined threshold that represents a point in time when each document page of the document remains active longer than desired by one or more users;
   determining, by the presentation controller, that the amount of time that the active document page is consecutively active on the presentation device exceeds the predetermined threshold; and
   in response to determining that the predetermined threshold has been exceeded, providing to a target source, by the presentation controller, a reminder including a page number of the active document page indicating the active document page remains active on the presentation device after exceeding the predetermined threshold.

2. The method of claim 1, wherein providing to the target source, by the presentation controller, the reminder including the page number of the active document page indicating the active document page remains active on the presentation device after exceeding the predetermined threshold further includes determining a native language of the one or more users and using the native language to provide the reminder to the target source.

3. The method of claim 1 wherein providing a reminder including a page number of the active document page indicating the document page that corresponds to the page number is active on the presentation device includes providing an audio output to a speaker, the audio output corresponding to an indication of the page number of the document page.

4. The method of claim 1 wherein providing a reminder including a page number of the active document page indicating the document page that corresponds to the page number is active on the presentation device includes transmitting an instant message with a message that includes the page number of the document page.

5. The method of claim 1 wherein providing a reminder including a page number of the active document page indicating that the document page that corresponds to the page number is active on the presentation device includes selecting the target source from a plurality of sources, wherein the target source is selected based on an output selection type that is user configurable.

6. The method of claim 1 wherein the presentation controller is a plug-in for a presentation application.

7. The method of claim 1, further comprising, in response to receiving the page change indication, erasing the amount of time that the document page is consecutively active.

8. The method of claim 1, wherein detecting activation of the document page includes receiving an indication that the document page is viewable by the user on a display.

9. An apparatus for indicating a page number of an active document page within a document, the apparatus comprising a computer processor, a computer memory operatively coupled to the computer processor, the computer memory having disposed within it computer program instructions that, when executed by the computer processor, cause the apparatus to carry out the steps of:
   detecting, by a presentation controller, activation of an active document page on a presentation device;
   in response to detecting the activation of the active document page on the presentation device, tracking, by the presentation controller, an amount of time that the active document page is consecutively active on the presentation device, being consecutively active including remaining on the active document page until receiving a page change indication;
   programming each document page of the document a predetermined threshold that represents a point in time when each document page of the document remains active longer than desired by one or more users;
   determining, by the presentation controller, that the amount of time that the active document page is consecutively active on the presentation device exceeds the predetermined threshold; and
   in response to determining that the predetermined threshold has been exceeded, providing to a target source, by the presentation controller, a reminder including a page number of the active document page indicating the active document page remains active on the presentation device after exceeding the predetermined threshold.

10. The apparatus of claim 9 wherein providing a reminder including a page number of the active document page indicating the document page that corresponds to the page number is active on the presentation device includes transmitting an instant message with a message that includes the page number of the document page.

11. The apparatus of claim 9 wherein providing a reminder including a page number of the active document page indicating the document page that corresponds to the page number is active on the presentation device includes selecting the target source from a plurality of sources, wherein the target source is selected based on an output selection type that is user configurable.

12. The apparatus of claim 9 wherein the presentation controller is a plug-in for a presentation application.

13. The apparatus of claim 9 wherein providing a reminder including a page number of the active document page indicating the document page that corresponds to the page number is active on the presentation device includes providing an audio output to a speaker, the audio output corresponding to an indication of the page number of the document page.

14. A computer program product for indicating a page number of an active document page within a document, the computer program product disposed upon a computer readable storage device, the computer program product comprising computer program instructions that, when executed, cause a computer to carry out the steps of:

detecting, by a presentation controller, activation of an active document page on a presentation device;

in response to detecting the activation of the active document page on the presentation device, tracking, by the presentation controller, an amount of time that the active document page is consecutively active on the presentation device, being consecutively active including remaining on the active document page until receiving a page change indication;

programming each document page of the document a predetermined threshold that represents a point in time when each document page of the document remains active longer than desired by one or more users;

determining, by the presentation controller, that the amount of time that the active document page is consecutively active on the presentation device exceeds the predetermined threshold; and in response to determining that the predetermined threshold has been exceeded, providing to a target source, by the presentation controller, a reminder including a page number of the active document page indicating the active document page remains active on the presentation device after exceeding the predetermined threshold.

15. The computer program product of claim 14 wherein providing a reminder including a page number of the active document page indicating the document page that corresponds to the page number is active on the presentation device includes providing an audio output to a speaker, the audio output corresponding to an indication of the page number of the document page.

16. The computer program product of claim 14 wherein providing a reminder including a page number of the active document page indicating the document page that corresponds to the page number is active on the presentation device includes transmitting an instant message with a message that includes the page number of the document page.

17. The computer program product of claim 14 wherein providing a reminder including a page number of the active document page indicating the document page that corresponds to the page number is active on the presentation device includes selecting the target source from a plurality of sources, wherein the target source is selected based on an output selection type that is user configurable.

18. The computer program product of claim 14 wherein the presentation controller is a plug-in for a presentation application.

* * * * *